US012438272B2

(12) United States Patent
Hollar et al.

(10) Patent No.: US 12,438,272 B2
(45) **Date of Patent: *Oct. 7, 2025**

(54) ULTRA-WIDEBAND (UWB) ANTENNAS AND RELATED ENCLOSURES FOR THE UWB ANTENNAS

(71) Applicant: Wiser Systems, Inc., Raleigh, NC (US)

(72) Inventors: Seth Edward-Austin Hollar, Raleigh, NC (US); Scott Francis Fisher, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 420 days.

This patent is subject to a terminal disclaimer.

(21) Appl. No.: 17/580,987

(22) Filed: Jan. 21, 2022

(65) Prior Publication Data

US 2022/0149526 A1 May 12, 2022

Related U.S. Application Data

(63) Continuation of application No. 15/767,498, filed as application No. PCT/US2016/061075 on Nov. 9, 2016, now Pat. No. 11,233,327.

(Continued)

(51) Int. Cl.
*H01Q 5/25* (2015.01)
*H01Q 1/12* (2006.01)
(Continued)

(52) U.S. Cl.
CPC ............. *H01Q 5/25* (2015.01); *H01Q 1/1221* (2013.01); *H01Q 1/36* (2013.01); *H01Q 1/42* (2013.01);
(Continued)

(58) Field of Classification Search
CPC .......... H01Q 25/005; H01Q 9/40; H01Q 9/28; H01Q 1/273; H01Q 1/1221; H01Q 9/16;
(Continued)

(56) References Cited

U.S. PATENT DOCUMENTS 4,143,377 A * 3/1979 Salvat .................... H01Q 19/06 343/773
5,771,025 A 6/1998 Reece ...................... H01Q 1/38 343/789
(Continued)

FOREIGN PATENT DOCUMENTS

CN 1957506 A 5/2007
CN 101861678 A 10/2010
(Continued)

OTHER PUBLICATIONS

First Office Action, Chinese Patent Application No. 201680065429.6, Oct. 11, 2019, 14 pages.
(Continued)

*Primary Examiner* — Ab Salam Alkassim, Jr.
(74) *Attorney, Agent, or Firm* — Stanek Lemon Crouse & Meeks, PA

(57) ABSTRACT

Ultra-wideband (UWB) antennas are provided including a printed circuit board; a radiating element coupled to the printed circuit board and substantially perpendicular thereto; and radio frequency (RF) electronics associated with the antenna integrated with the printed circuit board. Related enclosures and systems are also provided.

17 Claims, 16 Drawing Sheets

Related U.S. Application Data

(60) Provisional application No. 62/252,716, filed on Nov. 9, 2015.

(51) Int. Cl.

| | |
|---|---|
| ***H01Q 1/36*** | (2006.01) |
| ***H01Q 1/42*** | (2006.01) |
| ***H01Q 9/16*** | (2006.01) |
| ***H01Q 9/18*** | (2006.01) |
| ***H01Q 9/26*** | (2006.01) |
| ***H01Q 9/32*** | (2006.01) |
| ***H01Q 9/40*** | (2006.01) |
| *H01Q 1/38* | (2006.01) |

(52) U.S. Cl.
CPC ................. *H01Q 9/16* (2013.01); *H01Q 9/18* (2013.01); *H01Q 9/265* (2013.01); *H01Q 9/32* (2013.01); *H01Q 9/40* (2013.01); *H01Q 1/38* (2013.01)

(58) Field of Classification Search
CPC .......... H01Q 9/285; H01Q 9/44; H01Q 9/065; H01Q 13/04; H01Q 21/062
See application file for complete search history.

(56) References Cited

U.S. PATENT DOCUMENTS

| | | | | | |
|---|---|---|---|---|---|
| 5,872,546 | A * | 2/1999 | Ihara | H01Q 9/40 | 343/893 |
| 6,331,838 | B1 | 12/2001 | Scott et al. | | |
| 6,891,515 | B1 * | 5/2005 | Langley | H01Q 5/371 | 343/895 |
| 7,075,483 | B2 * | 7/2006 | Okado | H01Q 1/38 | 343/846 |
| 7,098,856 | B2 * | 8/2006 | Okado | H01Q 1/38 | 343/702 |
| 7,183,978 | B1 | 2/2007 | Azar | H01Q 1/38 | 343/700 MS |
| 7,187,329 | B2 | 3/2007 | Okado | H01Q 1/38 | 343/700 MS |
| 7,358,901 | B2 | 4/2008 | Eberhardt | H01Q 1/243 | 343/700 MS |
| 7,358,918 | B2 | 4/2008 | Itsuji | H01Q 9/28 | 343/700 MS |
| 7,471,256 | B2 | 12/2008 | Kwon | H01Q 9/28 | 343/795 |
| 7,750,868 | B1 * | 7/2010 | Dunn | H01Q 19/10 | 343/895 |
| 8,184,060 | B2 * | 5/2012 | Du | H01Q 9/40 | 343/773 |
| 8,514,130 | B1 | 8/2013 | Jensen et al. | | |
| 8,791,872 | B2 | 7/2014 | Coupez | H01Q 9/40 | 343/846 |
| 9,755,314 | B2 | 9/2017 | Puente Baliarda | H01Q 9/40 | |
| 10,677,911 | B2 | 6/2020 | Wotzel | H01Q 9/28 | |
| 10,734,717 | B2 | 8/2020 | Hosseini | H01Q 1/40 | |
| 11,095,035 | B2 * | 8/2021 | Klein | H01Q 1/38 | |
| 11,233,327 | B2 * | 1/2022 | Hollar | H01Q 5/25 | |
| 2001/0004249 | A1 * | 6/2001 | Sharp | H01Q 21/064 | 343/824 |
| 2003/0201939 | A1 | 10/2003 | Reece | H01Q 9/0407 | 343/700 MS |
| 2003/0210207 | A1 | 11/2003 | Suh | H01Q 1/38 | 343/895 |
| 2005/0156804 | A1 | 7/2005 | Ratni | H01Q 9/28 | 343/773 |
| 2005/0237258 | A1 * | 10/2005 | Abramov | H01Q 21/205 | 343/834 |
| 2005/0280582 | A1 * | 12/2005 | Powell | H01Q 13/16 | 343/846 |
| 2006/0071858 | A1 * | 4/2006 | Suh | H01Q 9/28 | 343/700 MS |
| 2006/0071871 | A1 | 4/2006 | Tang | H01Q 9/40 | 343/826 |
| 2006/0214869 | A1 * | 9/2006 | Kuroda | H01Q 9/30 | 343/846 |
| 2006/0232487 | A1 | 10/2006 | Hsu | H01Q 9/28 | 343/795 |
| 2007/0126637 | A1 | 6/2007 | Habib | H01Q 1/36 | 343/700 MS |
| 2008/0136730 | A1 * | 6/2008 | Chen | H01Q 9/30 | 343/866 |
| 2010/0136912 | A1 * | 6/2010 | Mohammadian | H01Q 1/242 | 343/702 |
| 2010/0219981 | A1 * | 9/2010 | Mohammadian | H01Q 9/40 | 343/702 |
| 2010/0231467 | A1 | 9/2010 | Schnuerer | | |
| 2011/0001679 | A1 * | 1/2011 | Meharry | H01Q 13/08 | 343/859 |
| 2011/0140858 | A1 * | 6/2011 | Ovard | H04J 13/0022 | 340/10.1 |
| 2012/0032861 | A1 | 2/2012 | Crowley | H01Q 11/105 | 343/725 |
| 2013/0021210 | A1 * | 1/2013 | Soekawa | H01Q 1/243 | 343/700 MS |
| 2013/0178170 | A1 * | 7/2013 | Schrabler | H01Q 19/104 | 343/837 |
| 2014/0070069 | A1 | 3/2014 | Taeger | | |
| 2014/0079269 | A1 | 3/2014 | Choi | | |
| 2015/0280317 | A1 * | 10/2015 | Morin | H01Q 9/28 | 343/795 |
| 2016/0013560 | A1 * | 1/2016 | Daniels | H01Q 9/42 | 29/601 |
| 2016/0048709 | A1 * | 2/2016 | Butler | H01Q 9/285 | 340/10.51 |
| 2016/0048713 | A1 * | 2/2016 | Bellows | G06K 7/10356 | 343/724 |
| 2016/0233582 | A1 | 8/2016 | Piskun | H01Q 1/22 | |
| 2017/0025766 | A1 | 1/2017 | Su | H01Q 9/42 | |
| 2017/0043228 | A1 * | 2/2017 | Hunter | G06K 19/0723 | |
| 2017/0110799 | A1 | 4/2017 | Holisaz | H01Q 21/205 | |
| 2018/0219294 | A1 | 8/2018 | Oh | H01Q 9/42 | |
| 2018/0241130 | A1 | 8/2018 | Hollar | H01Q 9/40 | |

FOREIGN PATENT DOCUMENTS

| | | | |
|---|---|---|---|
| CN | 201601217 | U | 10/2010 |
| EP | 1 542 314 | A1 | 6/2005 |
| JP | H07106841 | A | 4/1995 |
| JP | 2004-236248 | A | 8/2004 |
| WO | WO 2009/045219 | A1 | 4/2009 |

OTHER PUBLICATIONS

Communication pursuant to Rule 164(1) EPC, European Patent Application No. 1686487.1, May 16, 2019, 13 pages.

Communication—Extended European Search Report, European Patent Application No. 1686487.1, Aug. 28, 2019, 14 pages.

International Preliminary Report on Patentability, PCT/US2016/061075, May 15, 2018, 5 pages.

International Search Report and Written Opinion, PCT/US2016/061075, Feb. 2, 2017, 6 pages.

* cited by examiner

ULTRA-WIDEBAND (UWB) ANTENNAS AND RELATED ENCLOSURES FOR THE UWB ANTENNAS

CLAIM OF PRIORITY

The present application is a continuation application of Ser. No. 15/767,498, having a filing date of Apr. 11, 2018, which is a 35 U.S.C. § 371 national phase application of PCT International Application No. PCT/US2016/061075, having an international filing date of Nov. 9, 2016, which claims priority to United States Provisional Patent Application No. 62/252,716, having a filing date of Nov. 9, 2015. The disclosures of each application are hereby incorporated herein by reference in their entireties. The above PCT International Application was published in the English language as International Publication No. WO 2017/083347.

STATEMENT OF GOVERNMENT SUPPORT

This invention was made with government support under contract number 2013-33610-21513 awarded by United States Department of Agriculture (USDA). The United States Government has certain rights in this invention.

FIELD

This present inventive concept relates generally to antennas and, more particularly, to ultra-wideband antennas and related elements.

BACKGROUND

The Federal Communications Commission (FCC) limits power for the Ultra-wideband (UWB) using Equivalent Isotropically Radiated Power (EIRP), a measure that reduces output power with increasing directionality of the antenna. In some scenarios, there is incentive to make the antenna as isotropic as possible. Unlike narrow bandwidth antenna designs, UWB antennas can typically contain a solid large conducting radiating element. Some have addressed this issue by adding antennas on the printed circuit board (PCB) itself as illustrated in FIG. 1.

Referring now to FIG. 1, an antenna on a PCB will be discussed. As illustrated in FIG. 1, the elements of the antenna are provided on a PCB 103. The antenna elements include a ground plane 101 for the antenna, a radiating element 102 of the antenna, a ground plane 104 for the radio frequency (RF) electronics, a stripline 105 electrically connecting the radiating element 102 to RF electronics 106 on the PCB 103 and a ground connect 107 between the ground plane for the antenna 101 and the ground plane for the RF electronics 104.

The circuit ground plane 104 can distort the antenna pattern if placed too close thereto. Separating the ground plane for the antenna 101 and the ground plane for the RF electronics 104 can mitigate the distortion. However, the overall size of the PCB 103 may be enlarged and, therefore, results in the addition of the microstrip 105 from the RF electronics 106 to the radiating element 102. PCBs may be fabricated from FR4, which tends to be more cost effective. FR4 is a composite material composed of woven fiberglass cloth with an epoxy resin binder that is flame resistant (self-extinguishing). However, FR4 has a relatively high tangent loss that may result in loss along the microstrip 105 to the antenna. Furthermore, the radiating element 102 itself is embedded or sitting on top of FR4 that can further attenuate the antenna signal.

Another method of separating the ground plane 104 and the antenna is to make the antenna a separate element from the PCB. The antenna and the PCB are connected through mechanical connector, for example, a SubMiniature version A (SMA) or Bayonet Neill-Concelman (BNC) connector. However, this may complicate manufacturing by splitting the board into two parts and may increase the part count with connectors resulting in increased cost.

Compared to FR4, lower loss material exists, such as FR408 or Rogers 4350, but these materials typically cost more, increasing the overall cost of the antenna. Chip antennas also exist which can be relatively small, but there is a limited selection of such antennas, which may not provide for a low loss and an isotropic antenna pattern at the desired frequencies of the UWB band.

SUMMARY

Some embodiments of the present inventive concept provide ultra-wideband (UWB) antenna, the antenna including a printed circuit board; a radiating element coupled to the printed circuit board and substantially perpendicular thereto; and radio frequency (RF) electronics associated with the antenna integrated with the printed circuit board.

In further embodiments, the radiating element may be round and may be one of a disc and a disc with at least one hole in therein.

In still further embodiments, the radiating element may include a first radiating element and the antenna further includes a second radiating element. The first radiating element may be substantially perpendicular to a first surface of the printed circuit board and the second radiating element may be substantially perpendicular to a second surface, opposite the first surface, of the printed circuit board.

In some embodiments of the present inventive concept, the printed circuit board may define a hole therein. The antenna may further include a conducting tab coupled to the radiating element configured to extend through the hole in the printed circuit board and couple the radiating elements to the RF electronics. The conducting tab may have first and second portions, the first portion being wider than the second portion such that the second portion extends through a hole in the printed circuit board.

In further embodiments, the hole in the printed circuit board may be one of round and rectangular. The hole in the printed circuit board may be metalized.

In still further embodiments, the radiating element may be configured to be surface mounted to the printed circuit board.

In some embodiments, the antenna may further include a plurality of wires configured to carry electrical power and data to and from the printed circuit board; and a plurality of connection points on the printed circuit board, each of the plurality of connection points being associated with one of the plurality of wires.

In further embodiments, the antenna may further include a battery integrated on the printed circuit board to provide local power to the printed circuit board.

In still further embodiments, the RF electronics may be positioned on one of a surface of the printed circuit board remote from the radiating element and a surface of the printed circuit board adjacent the radiating element.

In some embodiments, the RF electronics are coupled to a battery integrated on the printed circuit board and a secondary RF communication circuit. The secondary RF communication circuit may be configured to communicate with a smart device to provide localization information.

Further embodiments of the present inventive concept provide a system including an enclosure and an antenna positioned within the enclosure. The antenna includes a printed circuit board; a radiating element coupled to the printed circuit board and substantially perpendicular thereto; and radio frequency (RF) electronics associated with the antenna integrated with the printed circuit board.

In still further embodiments, the enclosure may include a non-metallic material including at least one of plastic, wood, and rubber.

In some embodiments, the enclosure may include first and second portion, the first portion may be configured to receive the antenna and the second portion may be a stem connected the first portion. Wires may travel inside a stem, the stem being a hollow tube connected to the first portion of the enclosure.

In further embodiments, the system further includes a base unit, the base unit being configured to receive the enclosure.

In still further embodiments, the base unit may be configured to sit on a table, be mounted to a wall and/or mounted to a ceiling.

In some embodiments, the stem may be one of straight and curved.

DETAILED DESCRIPTION

Figure 1:
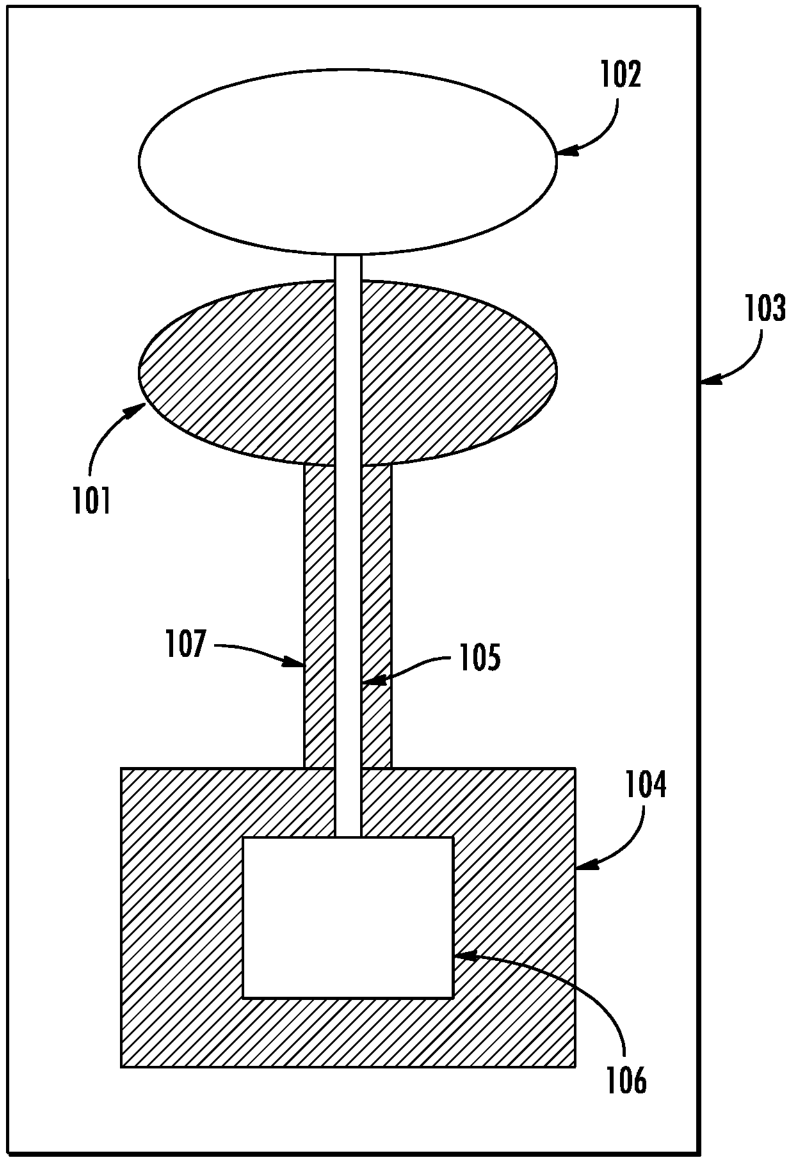
FIG. 1 (PRIOR ART)
FIG. 1 is a block diagram illustrating a conventional antenna on a printed circuit board (PCB).

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, the Federal Communications Commission (FCC) limits power for the Ultra-wideband (UWB) using Equivalent Isotropically Radiated Power (EIRP), a measure that reduces output power with increasing directionality of the antenna. In some scenarios, there is incentive to make the antenna as isotropic as possible. Unlike narrow bandwidth antenna designs, UWB antennas can typically contain a solid large conducting radiating element. Some embodiments of the present inventive concept provide UWB antennas having a reduced footprint of the PCB that remove the need for a stripline, and works with FR4 with little or no attenuation in the signal as will be discussed further below with respect to FIG. 2 through 8.

Figure 2:
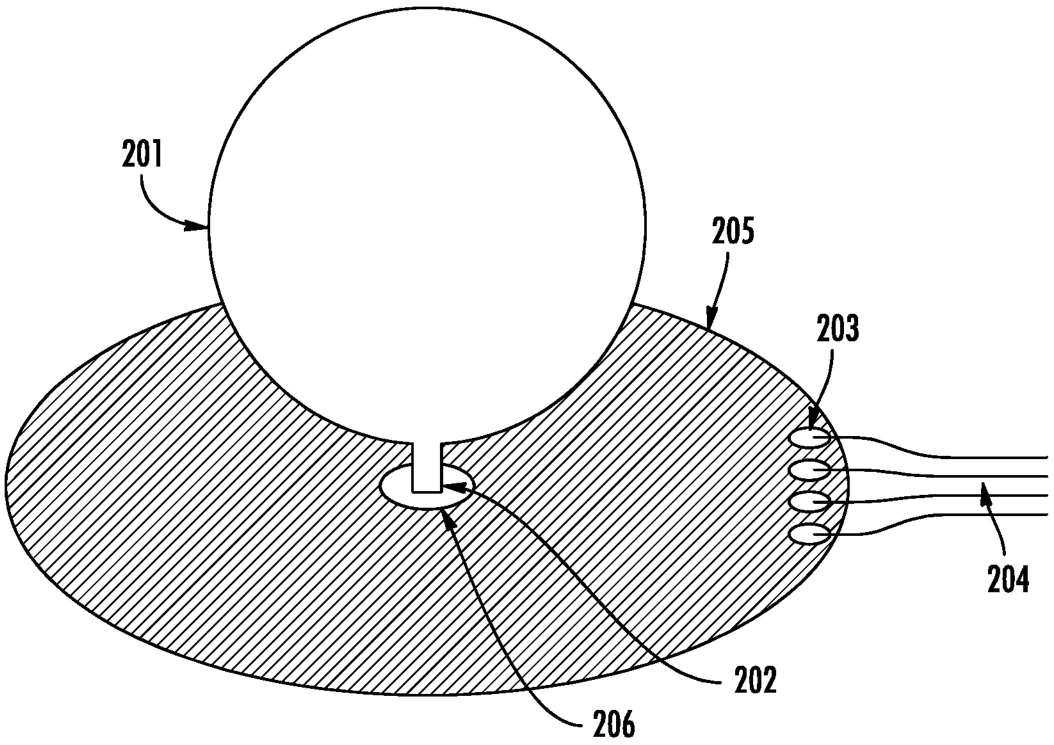
FIG. 2 is a block diagram an antenna in accordance with some embodiments of the present inventive concept.

Referring first to FIG. 2, an antenna in accordance with some embodiments of the present inventive concept will be discussed. As illustrated in FIG. 2, the antenna including a radiating element 201, a conducting tab 202, connection points 203 and wires 204 connected thereto, a printed circuit board (PCB) 205 and a hole 206 in the PCB 205. As further illustrated, the radiating element 201 is orthogonal to the PCB 205. The hole 206 in the PCB 205 provides a pathway for the radiating element 201 to connect to RF circuitry (not shown) on the PCB 205 via the narrow conducting tab 202. It will be understood that electronics can be placed on a top or bottom surface of the PCB 205 without departing from the scope of the present inventive concept. In some embodiments, the hole 206 in the PCB 205 may be metalized, for example, coated with a metal. In these embodiments, the tab 202 can be soldered directly to the hole 206 to make both an electrical and mechanical connection. In some embodiments, the radiating element is mechanically held to the PCB board with glue applied to the tab area for additional strength. Non-conductive glue may be applied near the hole and tab area to hold the radiating element in place.

Electrical power and data are run through the plurality of wires 204 that connect to the PCB 205 at the connection points 203. The plurality of wires 204 can, for example, be soldered directly to the board, attached with a connector and the like. In some embodiments, the plurality of wires 204 protrudes from a side portion of the PCB 205. In some embodiments, the plurality of wires 204 may run away from the board such that the plurality of wires 204 and a face of the radiating element 201 lie in the same plane. In some embodiments, the plurality of wires 204 may run perpendicular to the board (not shown) extending away from the PCB 205 on the opposite side of the radiating element 201 in the same plane. These embodiments may further reduce any distortion to the isotropic antenna pattern. Furthermore, in addition to power, additional data lines can run out of the PCB 205. In some embodiments, the data and power lines can serve as lines for a universal serial bus (USB) connection. In some embodiments, lines for a universal asynchronous receiver/transmitted (UART) can be used. The connector could be any number of standard power connectors. In some embodiments, the connector is a standard 120V AC wall plug, power over Ethernet or wireless. In further embodiments, the connector is any type of light bulb socket.

Although not illustrated in FIG. 2, in some embodiments, a battery may be integrated onto the PCB 205. In these embodiments, the plurality of wires 204 and associated connectors 203 may or may not be necessary since power is provided by the battery.

Referring again to FIG. 2, the radiating element 201 can include, for example, electrically conductive material, such as copper and silver. Although the antenna in FIG. 2 is illustrated as a round antenna, embodiments of the present inventive concept are not limited to this configuration. For example, the antenna can take any shape to achieve the desired antenna pattern without departing from the scope of the present inventive concept. Anisotropic antenna patterns can also be created by changing the shape and size of the radiating element 201 and/or the PCB 205. In some embodiments, the radiating element 201 maybe round except for a small tab 202 at the bottom as illustrated in FIG. 2. The width of the tab 202 and thickness of the metal can be chosen such that the tab 202 fits through a hole 206 in the PCB 205.

Figure 3:
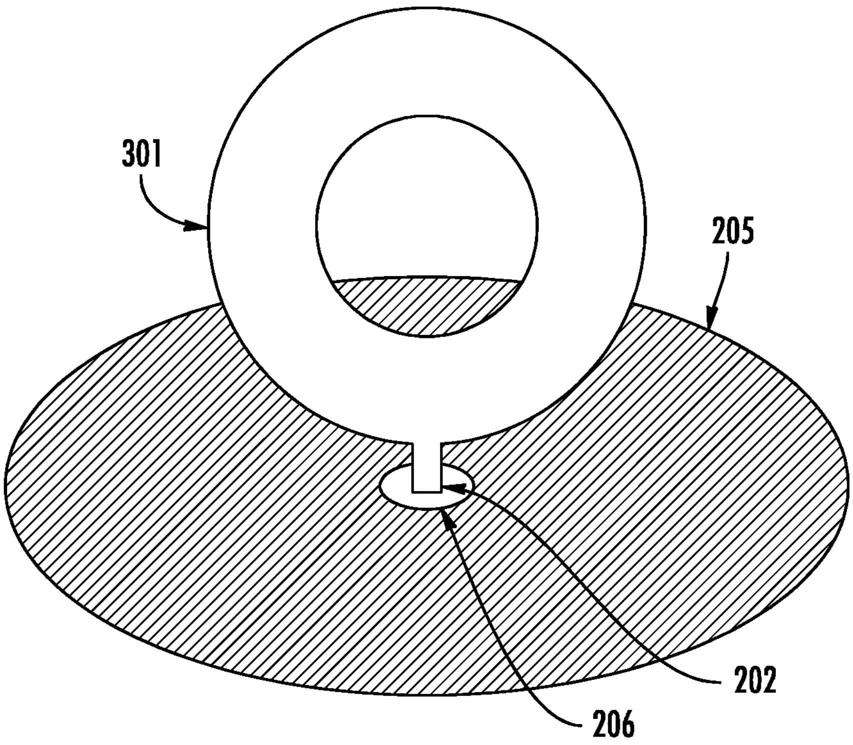
FIG. 3 is a block diagram illustrating an antenna having a radiating element with one or more holes in accordance with some embodiments of the present inventive concept.

Referring now to FIG. 3, a diagram of an antenna including a radiating element with a hole therein will be discussed. It will be understood that like reference numerals of FIG. 3 refer to like elements discussed above with respect to FIG. 2 and, thus, details thereof may be omitted for the sake of brevity. As illustrated in FIG. 3, in some embodiments of the inventive concept, the radiating element 301 may include one or more holes therethrough. The hole(s) can be used to modify the frequency behavior of the antenna. For example, if there was a desire to reduce the sensitivity at a certain frequency, a hole in the antenna could be added. Although embodiments illustrated in FIG. 3 show a round hole in the radiating element, embodiments of the present inventive concept are not limited to this configuration. There may be more than one hole in radiating element and it can be other shapes without departing from scope of the present inventive concept.

Figure 4:
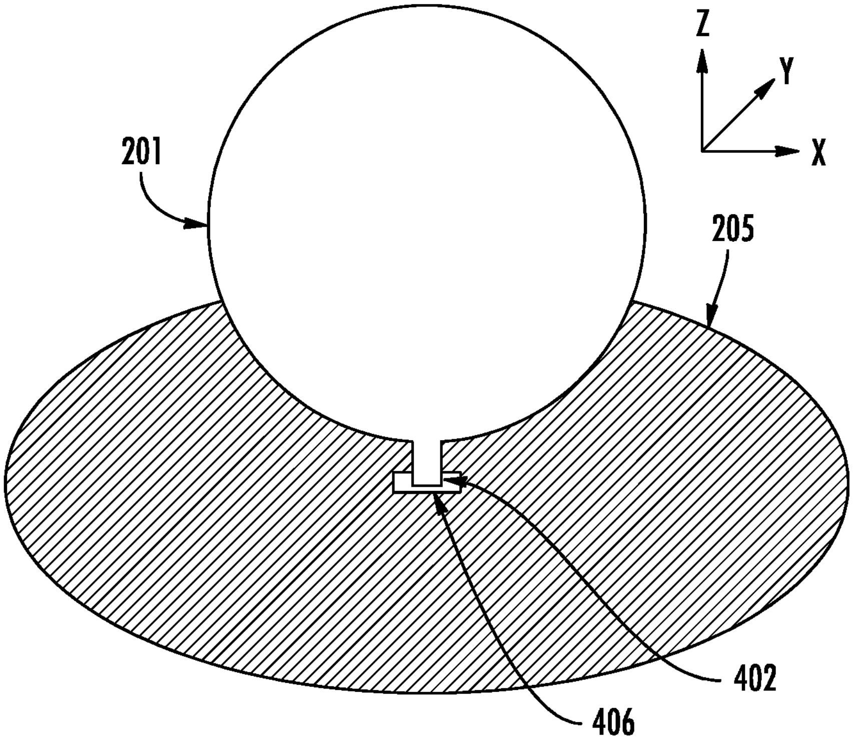
FIG. 4 is a block diagram illustrating an antenna including a tab in accordance with some embodiments of the present inventive concept.

Referring now to FIG. 4, a diagram illustrating an antenna with a hole in the PCB in accordance with some embodiments of the present inventive concept will be discussed. It will be understood that like reference numerals of FIG. 4 refer to like elements discussed above with respect to FIG. 2 and, thus, details thereof may be omitted for the sake of brevity. As illustrated in FIG. 4, the tab 402 at the bottom of the radiating element 201 may be rectangular in shape having a width that is longer than a thickness thereof. Accordingly, the PCB hole 406 may also be rectangular shaped such that the tab 402 fits in the hole 406. It will be understood that embodiments illustrated in FIG. 4 only allow the radiating element 201 to fit in the hole 406 for one orientation. The tab 402 will not fit into 406 if the antenna is rotated about the Z axis.

Embodiments of the present inventive concept discussed above with respect to FIGS. 2-4 all include a single radiating element. Often times, transceiver integrated circuits have a dual differential port for the antenna. For single ended antennas, a balun may be used to convert the single port of the antenna to the dual port of the RF integrated circuit (IC). Thus, some embodiments of the present inventive concept provide antenna embodiments where a balun may not be necessary.

Figure 5:
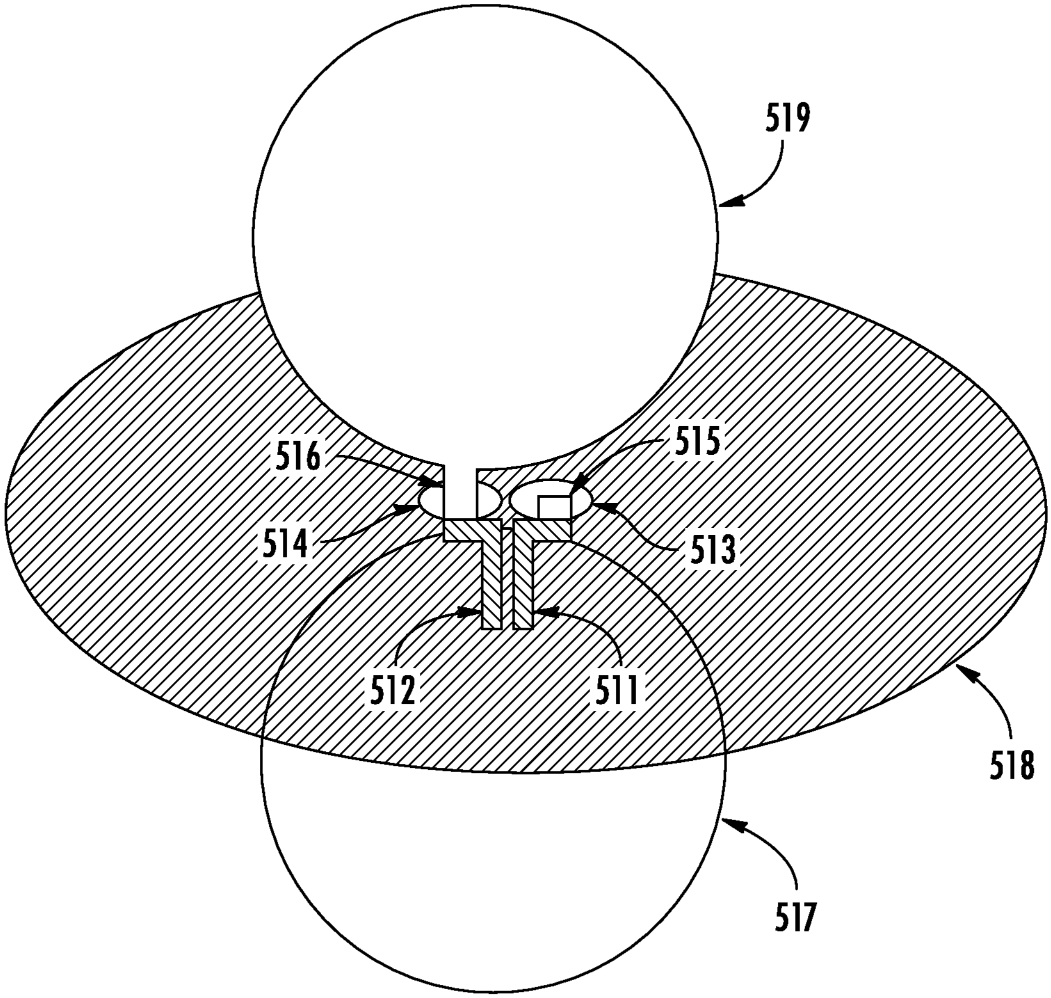
FIG. 5 is a block diagram illustrating a differential antenna including multiple radiating elements in accordance with some embodiments of the present inventive concept.

Referring now to FIG. 5, a diagram illustrating a differential antenna in which a balun in not needed will be discussed. As illustrated in FIG. 5, the antenna includes PCB wirings 511 and 512, holes 513 and 514, tabs 515 and 516, radiating elements 517 and 519 and PCB 518. As illustrated in FIG. 5, a first radiating element 519 of the antenna is orthogonal and above a first surface of the PCB 518. A second radiating element 517 of the antenna is orthogonal and below a second surface of the PCB 518 as illustrated in FIG. 5. A first tab 516 connected to radiating element 519 is soldered to the PCB 518 at hole 514. PCB wiring 512 connects the radiating element 519 to one antenna port of the RF circuitry (not shown). A second tab 515 is soldered to the board at hole 513 and is connected to the PCB wiring 511. The PCB wiring 511 electrically connects the radiating element 517 to the other antenna port of the RF circuitry (not shown). It will be understood that embodiments of the present inventive concept illustrated in FIG. 5 are provided for example only and that embodiments of the present inventive concept are not limited to this configuration.

Embodiments discussed above with respect to FIGS. 2 through 5 have mounting points of the radiating elements to the PCB illustrates as holes in the PCB. Some embodiments of the present inventive concept provide radiating elements soldered to a surface mount pad of the board without departing from the scope of the present inventive concept. In some embodiments, the tab element connected to the radiating element is curved 90 degrees to allow the tab to be soldered to the surface mount pad and still have the antenna sit orthogonal to the plane. Using the manufacturing methods described heretofore to create a radiating element and tab from a sheet of metal, the tab element can subsequently be bent at a right angle to make contact with the surface mount pad.

Figure 6:
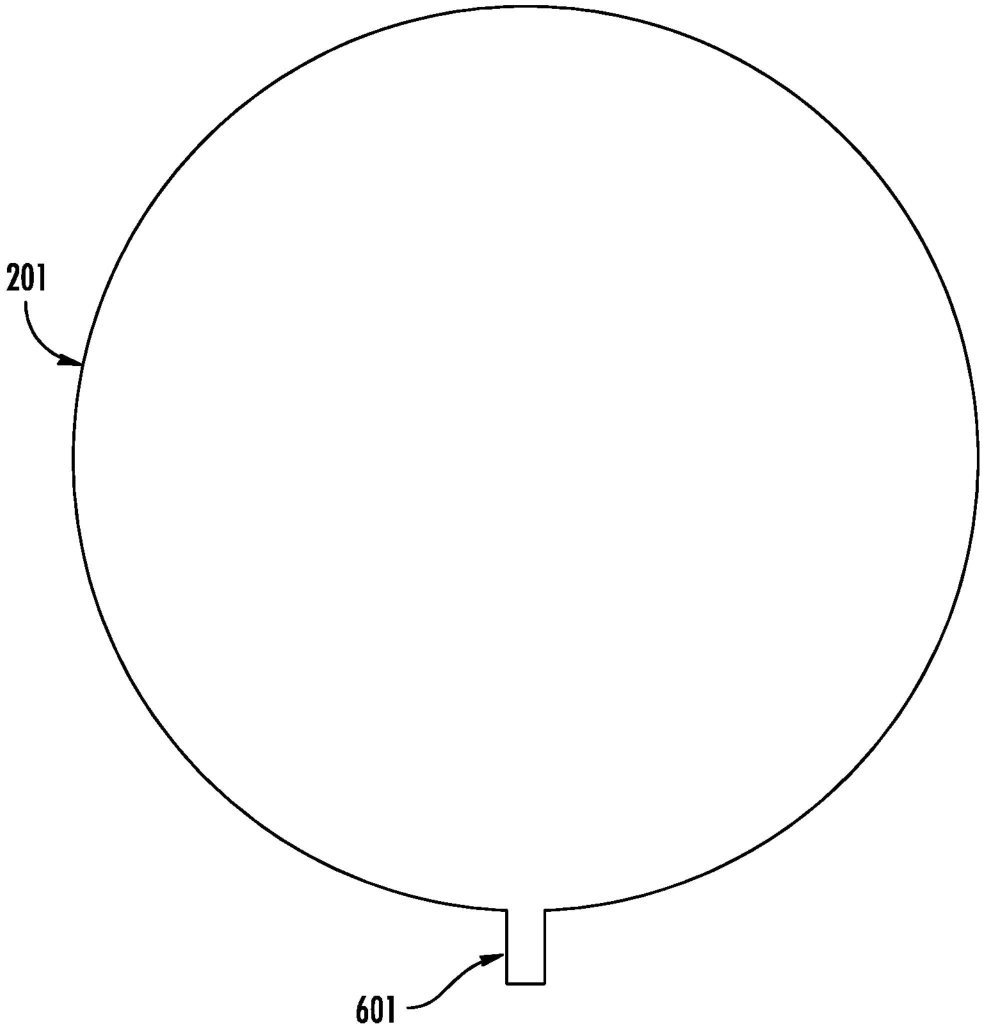
FIG. 6 is a block diagram illustrating a radiating element with a tab in accordance with some embodiments of the present inventive concept.

Referring now to FIG. 6, a radiating element of antennas in accordance with some embodiments of the present inventive concept will be discussed. As illustrated in FIG. 6, the radiating element 201 has a tab 601. The tab 601 may be used to electrically connect the radiating element 201 to a PCB (not shown). In some embodiments, at least a portion of the radiating element 201 and the tab 601 may be created from sheet metal. Any process that can cut out the sheet metal can be used without departing from the scope of the present inventive concept. Examples of manufacturing are metal stamping and water jetting. In embodiments using stamping, a sheet of the material is placed over a tool and die, and the desired shape is stamped out with the tool. In embodiments using water jet, a stream of high pressure water follows the outlines of the part cutting out the correct shape. In some embodiments, the tab 601 may be designed to precisely set the distance between the base of the radiating element 201 and the PCB by tapering the width of the tab.

Figure 7:
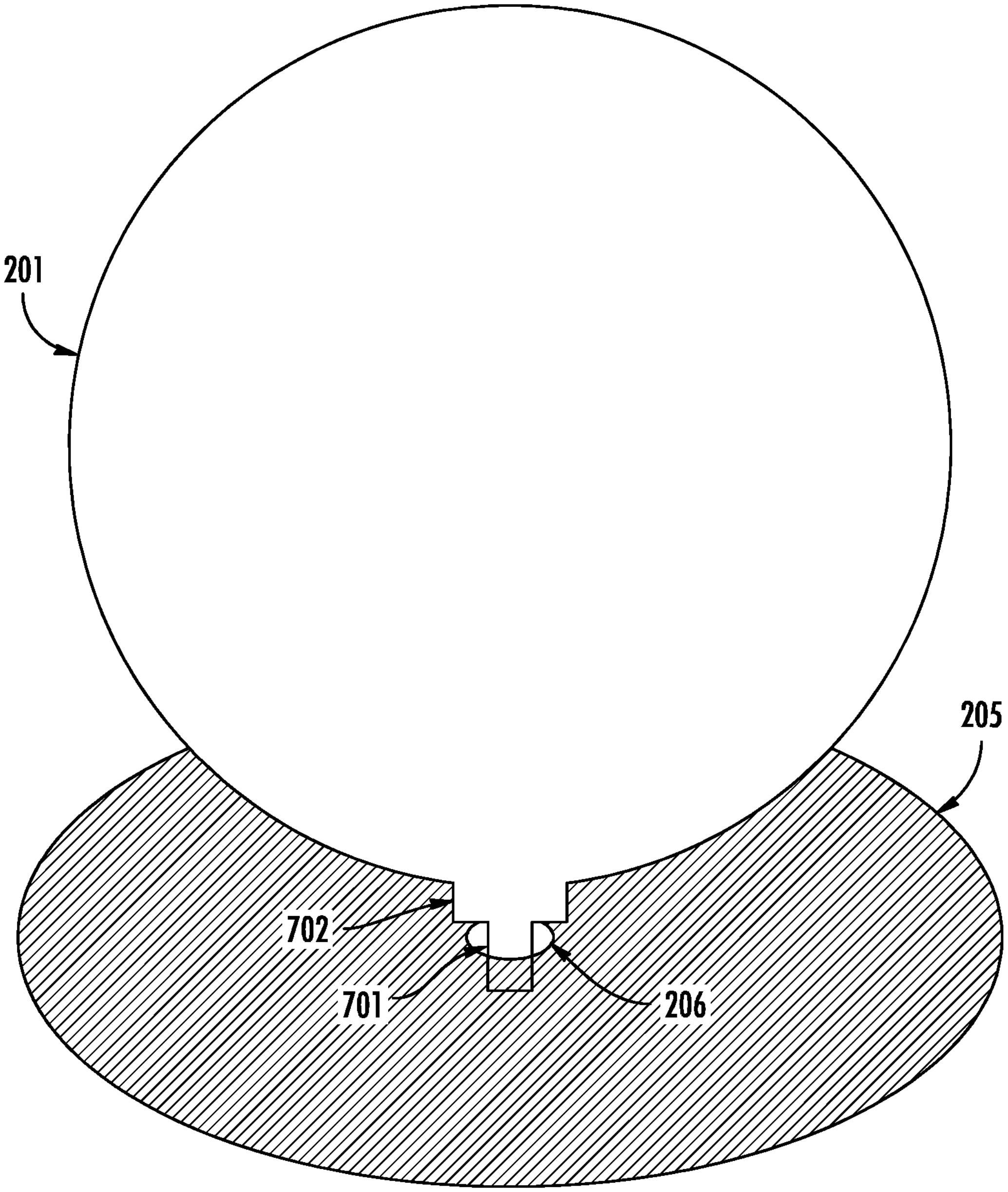
FIG. 7 is a block diagram illustrating of an antenna with an adaptable height in accordance with some embodiments of the present inventive concept.

Referring now to FIG. 7, a diagram of an antenna having a radiating element with an adjustable height in accordance with some embodiments of the present inventive concept will be discussed. As illustrated in FIG. 7, the antenna includes a PCB 205 having a hole 206, first and second tabs 701 and 702 and a radiating element 201. Embodiment of the inventive concept illustrated in FIG. 7 can set a height of the radiating element 201 above the PCB 205. In particular, the radiating element 201 is attached to a first portion of a tab 702. A second portion of the tab 701, smaller than the first portion 702, is connected to 702. A width of the hole 206 is smaller than the width of the tab 702, but larger than the width of the tab 701. The tab 701 is placed in the hole 206 until 702 contacts the PCB 205. Since a width of the tab 702 is larger than a diameter of the hole 206, the tab cannot go any farther into the hole 206 once the tab 702 contacts the hole 206. Thus, a height of the radiating element 201 above the PCB 206 is the height of the tab 702. It will be understood that embodiments of the present inventive concept are not limited to embodiments illustrated in FIG. 7. Other embodiments may be provided that include different configurations of the tabs, for example, tabs may have oval, triangular or trapezoidal shapes without departing from the scope of the present inventive concept.

Figure 8:
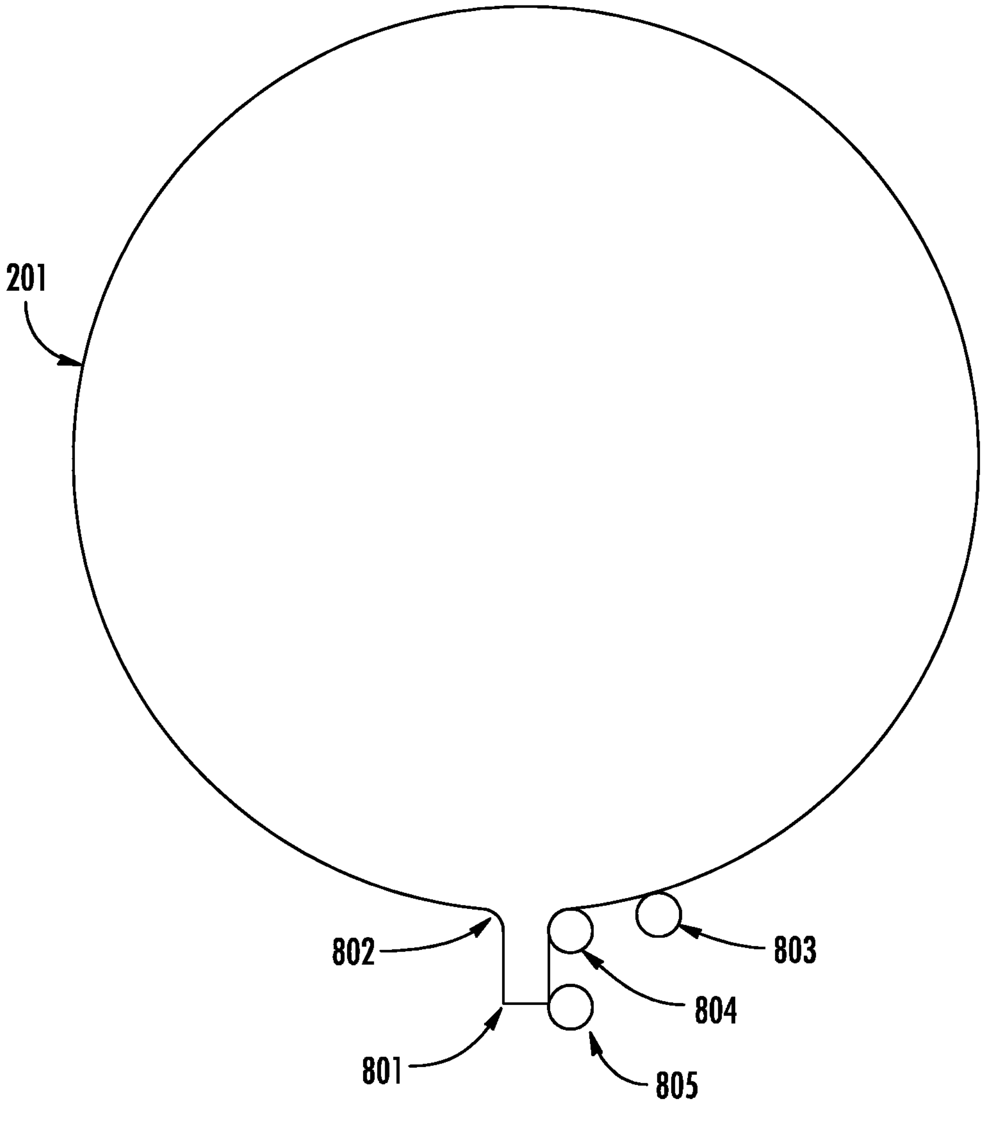
FIG. 8 is a block diagram illustrating a radiator element and tab in accordance with some embodiments of the present inventive concept.

Referring now to FIG. 8, a diagram of a radiating element after water jetting in accordance with some embodiments discussed herein will be discussed. As illustrated in FIG. 8, the radiating element 201 has a tab 801 and a curved element 802 connecting the tab 801 to the radiating element 201. In embodiments illustrated in FIG. 8, the distance above the PCB of the radiating element 201 is set by the size of the jet of water in the water jet machine. For example, the stream of water is not infinitesimally small, but takes up some amount of area usually in the shape of a circle with a known radius. If the radius of the water jet is, for example, 0.04 inches, then sharp features on the antenna will be smoothed out according to the water jet cutting radius. A cross section of the water stream 803, 804 and 805 is illustrative of points along the cutting path of the water jet as it traverses the cutting path for the sheet metal. The water jet travels from 803 to 804 cutting out a section of the radiating element. As it goes from 804 to 805, the tab element 801 is cut out. During the cutting at 804, the diameter of the water jet limits any sharp features where the tab 801 meets the radiating element 201. The resulting radius flares out.

When the tab 801 fits in the hole of the PCB, similar to, for example, FIG. 7, the flare out of 802 reduces, or possibly, prevents the radiating element 201 from being flush with the PCB, thus providing the radiating element 201 a small but noticeable amount of offset from the PCB.

It will be understood that the tabs illustrated in FIGS. 7 and 8 are provided for example only and embodiments of the present inventive concept are not limited to the configurations therein. For example, the tab can also be designed for a force fit in the PCB for easy assembly. In some embodiments, the tab size is just a little larger than the hole size, so during assembly the antenna tab is compression fit into the hole.

As discussed above, UWB antennas orthogonal to a PCB board may reduce, or possibly minimize loss, and have a reduced overall size. In particular, embodiments of the present inventive concept provide a UWB antenna design that is orthogonal to the PCB. Embodiments discussed herein may reduce, or possibly, eliminate the need for long, lossy strip-lines. Furthermore, the arrangement of the antenna may reduce the dependency of the loss tangent of PCB on the antenna efficiency.

In addition to embodiments discussed above with respect FIGS. 1 through 8, some embodiments of the present inventive concept provide a PCB board and radiating element that are enclosed by a protective case, referred to herein as an "enclosure." Some embodiments are directed to holding the antenna in place within an enclosure as will be discussed further below with respect to FIGS. 9 through 16.

Figure 9:
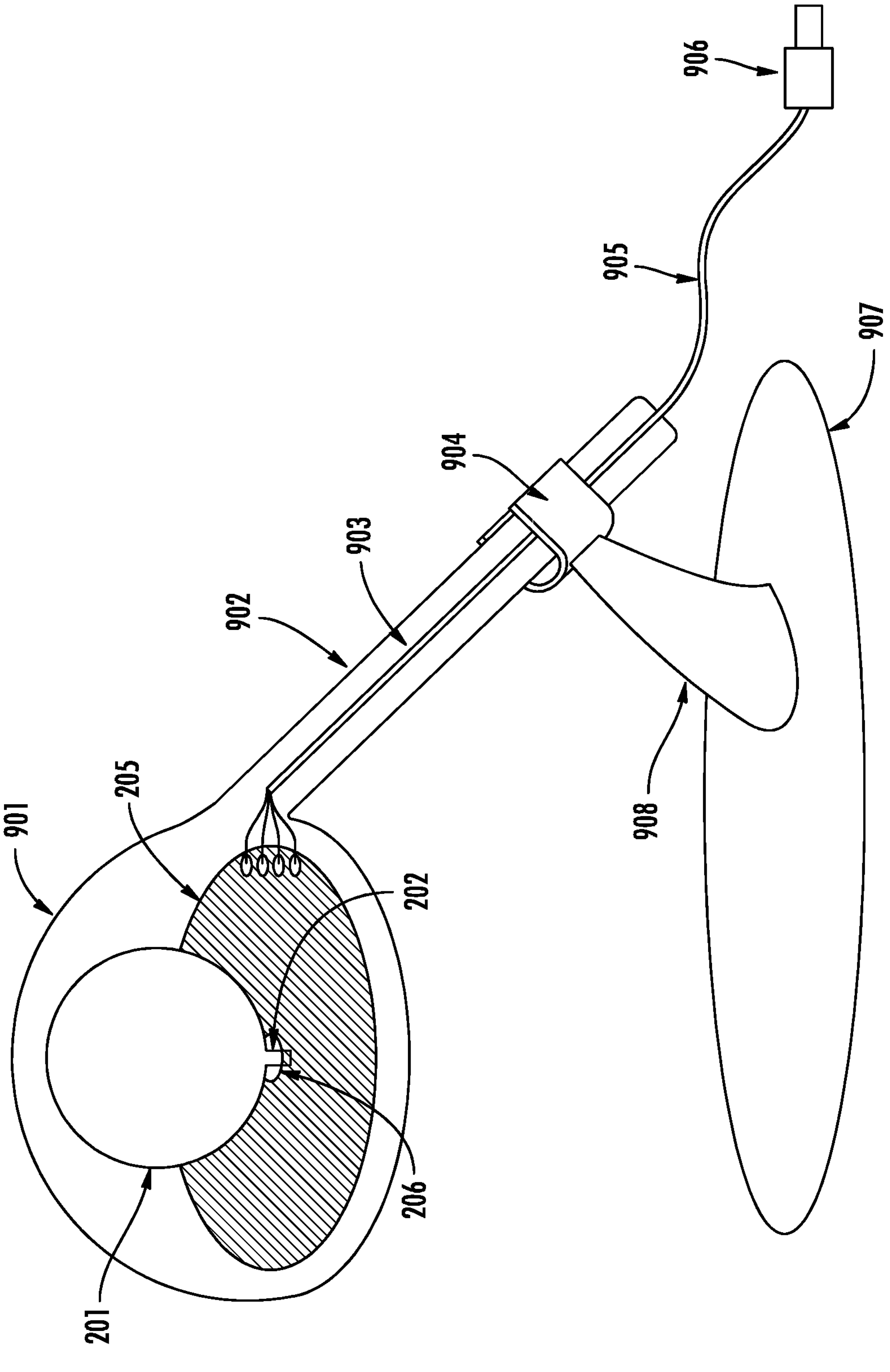
FIG. 9 is a diagram illustrating an enclosure including an antenna in accordance with some embodiments of the present inventive concept.
Figure 10:
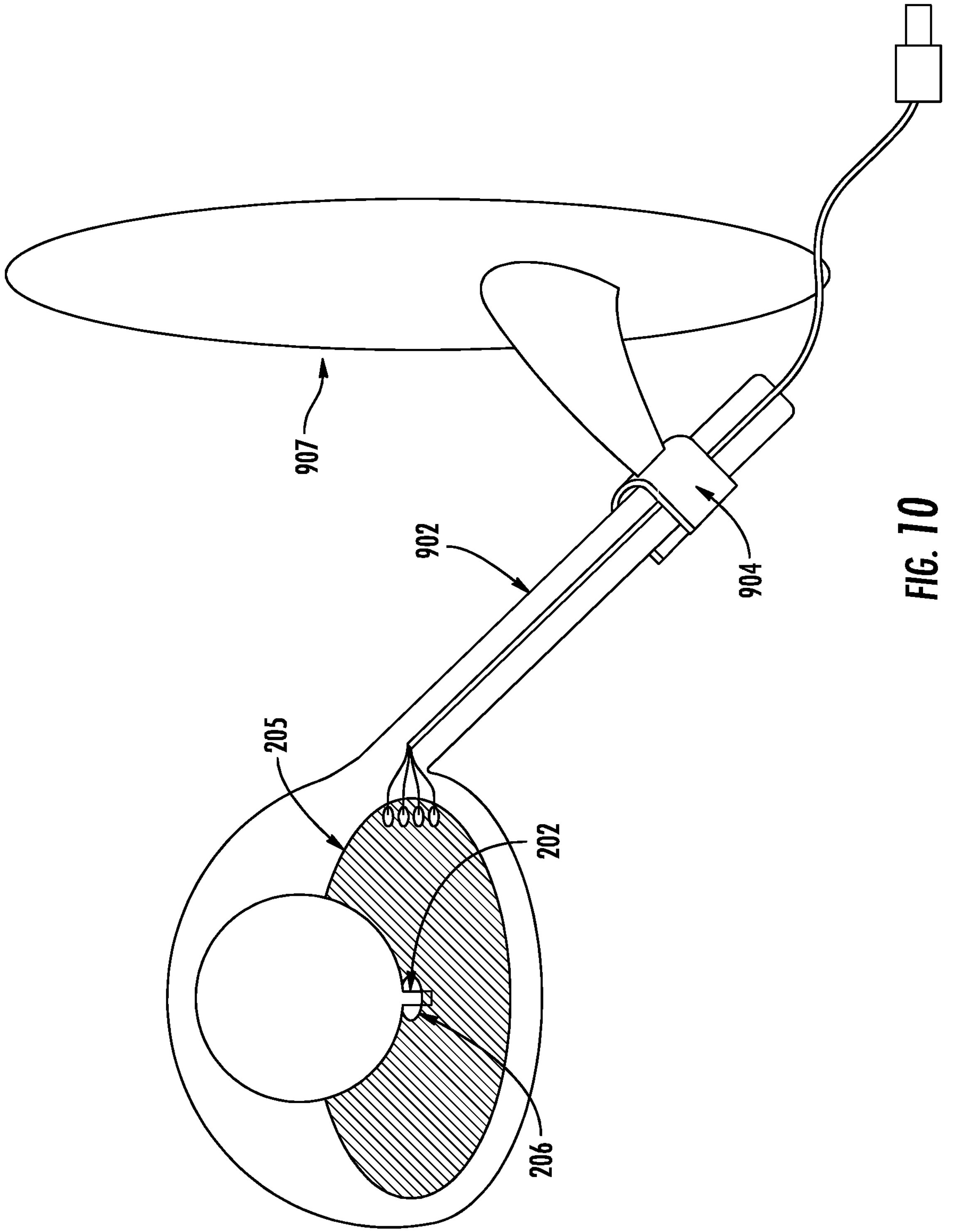
FIG. 10 is a diagram illustrating an enclosure including an antenna in accordance with some embodiments of the present inventive concept.

Referring first to FIG. 9, an enclosure holding the antenna in accordance with some of the embodiments of the present inventive concept will be discussed. As illustrated in FIG. 9, the PCB board 205 and radiating element 201 are housed within the enclosure 901. The enclosure material could be any non-metallic material. For example, the enclosure material may include a variety of plastics, wood, or rubber. Wires 903 are connected to connection points on the PCB 205. The wires 903 exit the enclosure 901. In this embodiment, the wires 903 travel inside a stem 902 which is attached to the enclosure 901. The stem 902 is a hollow tube connected to the enclosure 901. The wires 903 exit the stem 902 and end at a connector 906, which as could contain, for example, power and data lines. In some embodiments, however, the wires 903 may exit the enclosure 901 without going through the stem 902 (not shown). In some embodiments, the connector could be a USB end connector, though other connectors may be used without departing from the scope of the present inventive concept.

As further illustrated in FIG. 9, the stem 902 is connected to a base unit composed of a base 907, a support 908, and a clasp 904. In some embodiments, the stem 902 can attach and detach from the clasp 904. In some embodiments, a clasp 904 may not be used to attach/detach the stem to the base unit. Other methods may be used to connect the stem 902 to the base unit, for example, a slot and pin connection. In some embodiments, there is not a removable connection and the stem 902 is fixed onto the base unit.

Figure 15:
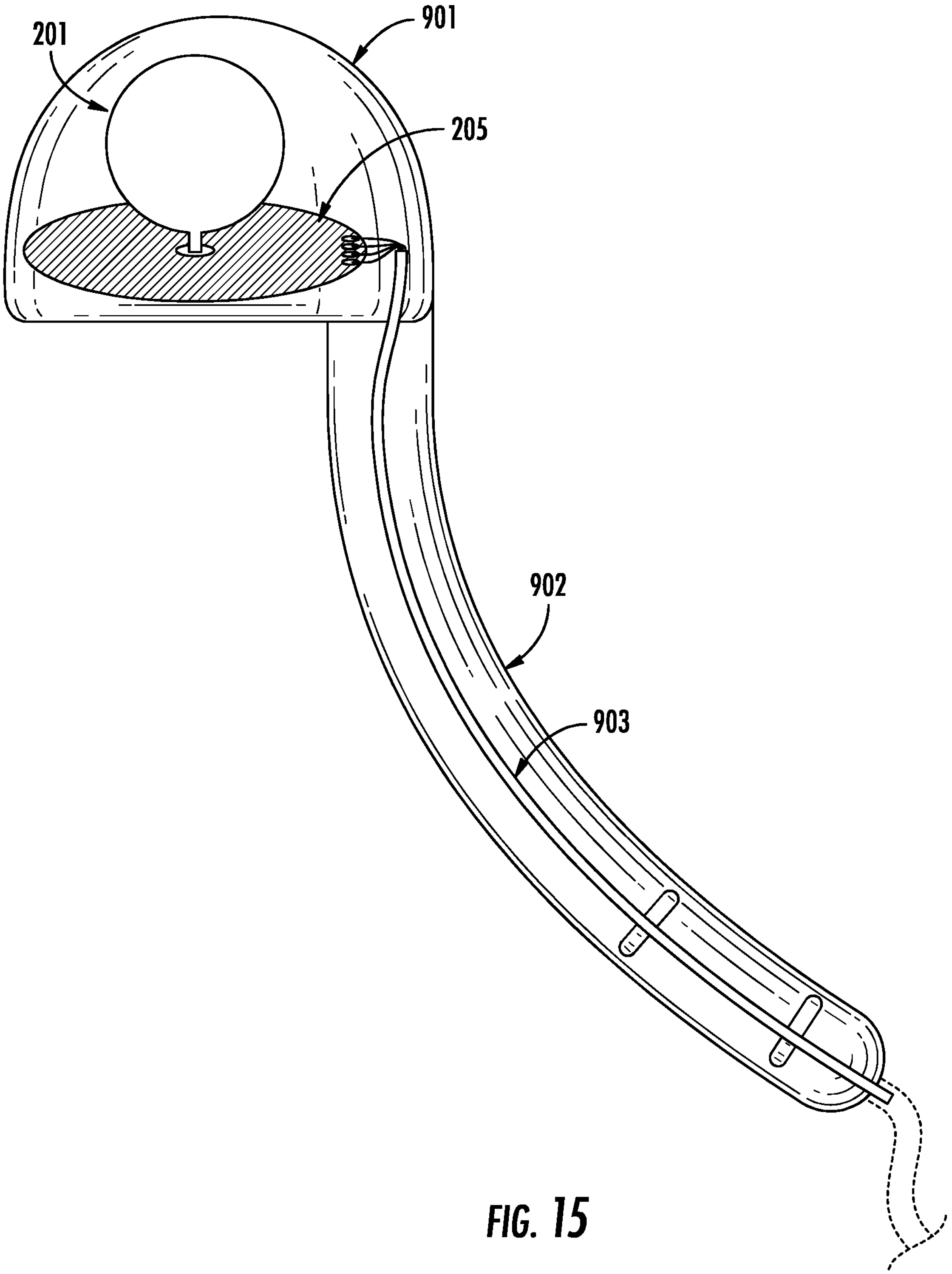
FIG. 15 is a diagram illustrating an enclosure according to some embodiments of the present inventive concept.

In some embodiments, the base unit can be placed on a table, mounted to a wall or ceiling, and the like. In some embodiments, the orientation of the radiating element may need to be vertical as depicted on the picture. However, in some embodiments, the configuration of the base unit may only allow it to lie horizontally if the radiating element is to remain vertically oriented. For mounting such a unit on the wall, the stem 902 may be angled 45 degrees downward so that the base 907 lies horizontal in one configuration and vertical in the other as illustrated, for example, in FIG. 10. Although FIG. 9 shows the stem 902 as being straight, the stem could also be curved as long as the base of the stem were at a 45 degree angle as described as illustrated in FIG. 15, which will be discussed below. In some embodiments, two different connecting locations could be added to the base of the stem such that the base unit could connect to either location.

It will be understood that connection of the base unit to the stem may not be permanent. For example, in some embodiments, the two pieces may be detached and re-attached without damage to the pieces. In some embodiments, the base of the stem 902 may not necessarily be 45 degrees. A base unit can lie horizontally, vertically, or at any angle in between without departing from the scope of the present inventive concept. In some embodiments, multiple base units, each lying at different angles to a surface can be connected to the same stem.

Figure 11:
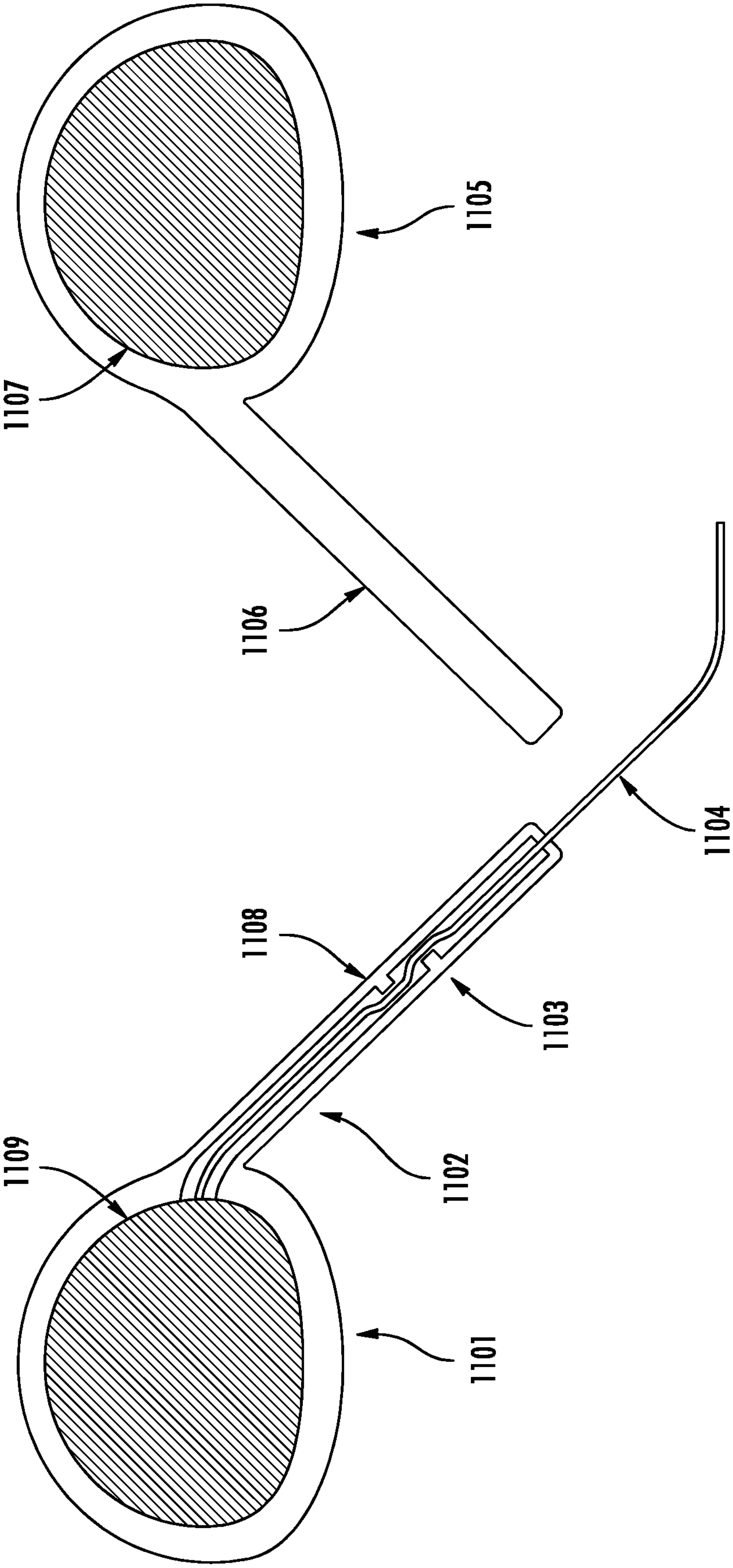
FIG. 11 is an exploded view illustrating an enclosure according to some embodiments of the present inventive concept.

As illustrated in FIG. 11, in some embodiments the enclosure and stem may be a two piece assembly. As illustrated, the stem is divided in half with 1102 and 1106 being two halves of the stem that can be mated together. Likewise two halves of the enclosure are 1101 and 1105 are also provided with similar mating capabilities. Portions 1101 and 1102 are one part, and portions 1105 and 1106 are the other part. Portions 1109 and 1107 show the hollow area within the enclosure that holds the PCB and radiating element. The stem pieces 1102 and 1106 are hollow to allow the wires 1104 to traverse through them. The notches 1108 and 1103 protrude into the hollow area of the tube and pinch the wires 1104 as shown. This reduces the likelihood, or possibly prevents, the wires 1104 from slipping down the stem when pulled on from the outside reducing the stress of the connection of the wires to the PCB board.

Figure 12:
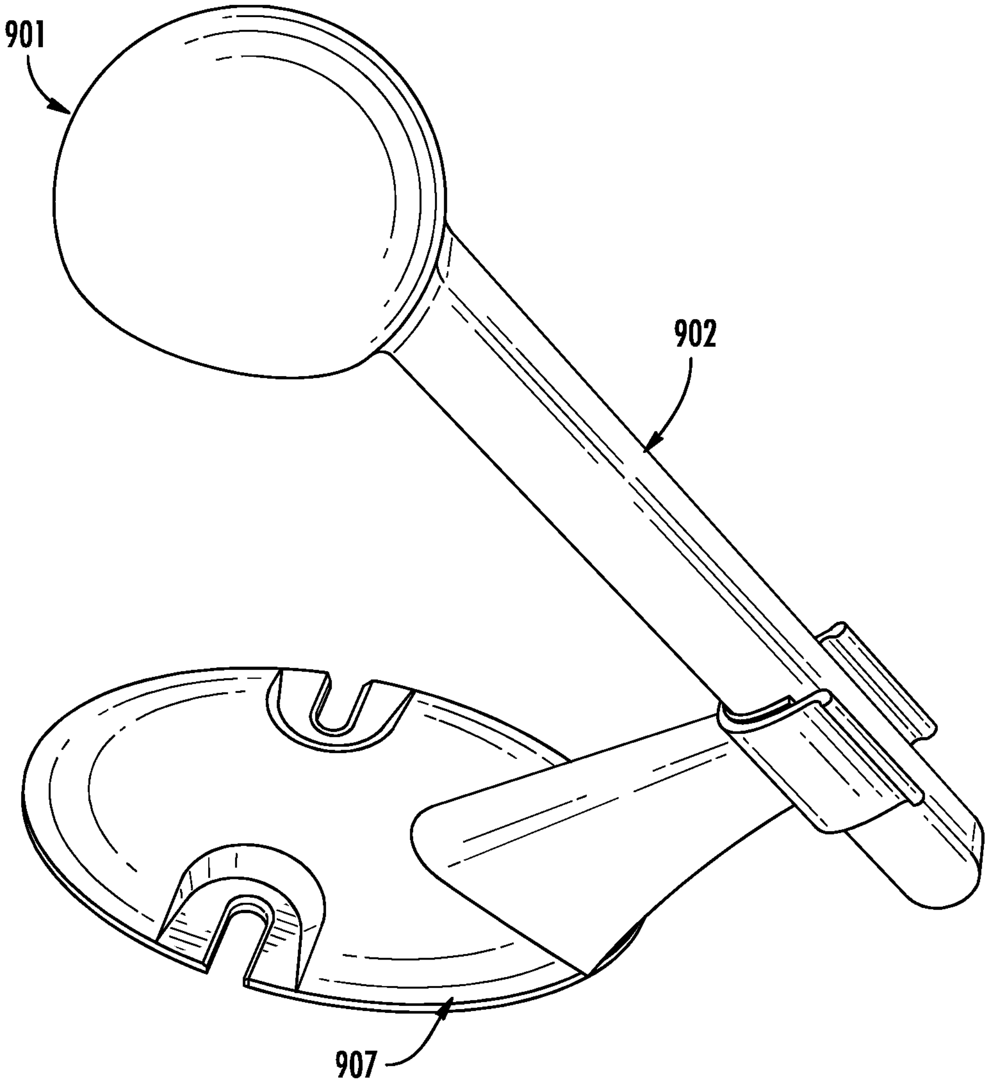
FIG. 12 is a picture illustrating a three dimensional printed enclosure in accordance with some embodiments of the present inventive concept.
Figure 13:
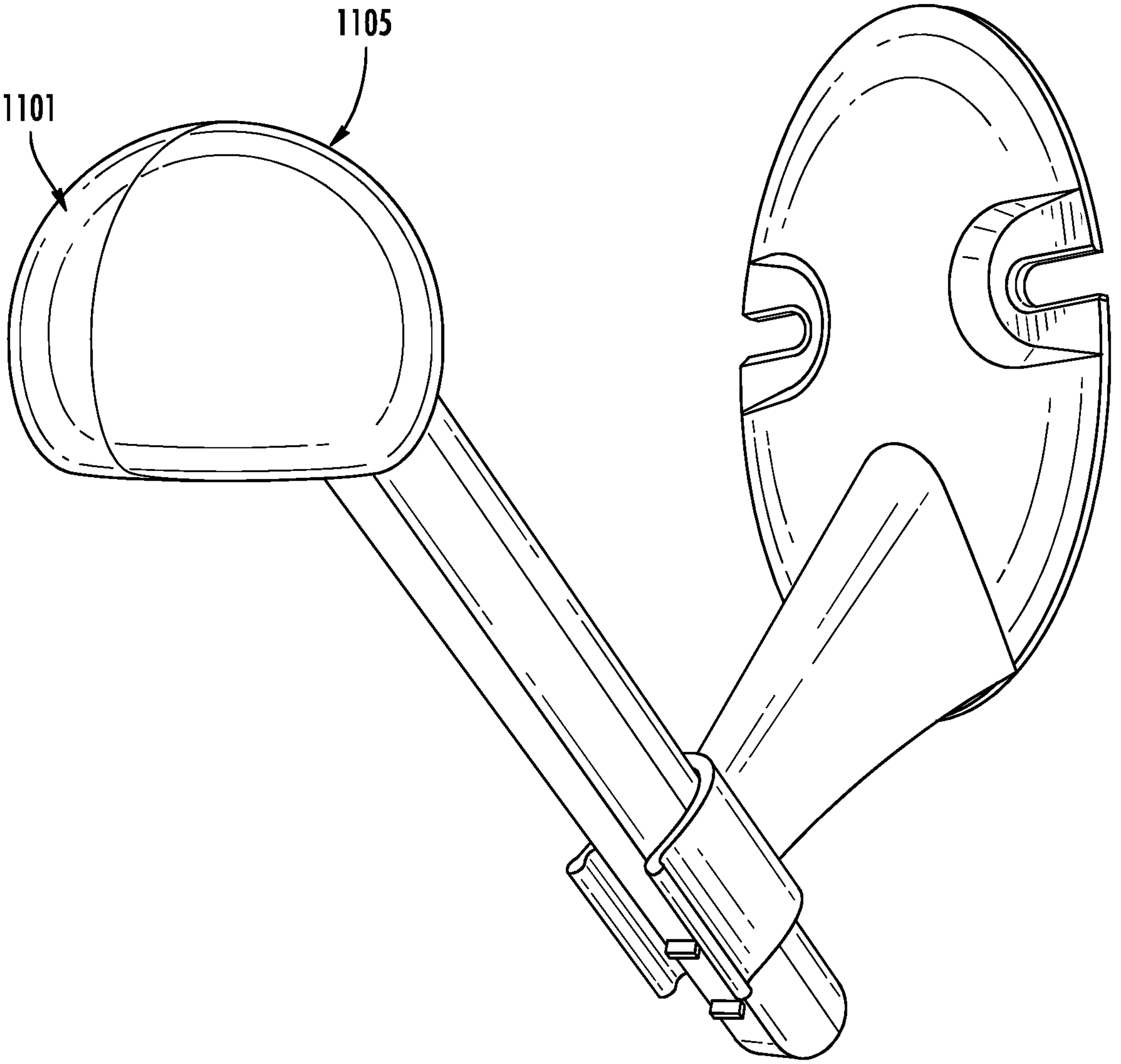
FIG. 13 is a diagram illustrating the enclosure in accordance with some embodiments of the present inventive concept.

FIG. 12 illustrates a picture of a 3d printed enclosure, stem, and base example where the base is connected to the stem such that it can rest horizontally on a flat surface. FIG. 13 is a rendered image of a similar looking enclosure, stem, and base example. The two halves 1101 and 1105 of the enclosure/stem are colored differently to show the separate pieces. In this image, the base is connected to the stem such that it can be mounted vertically.

Figure 14:
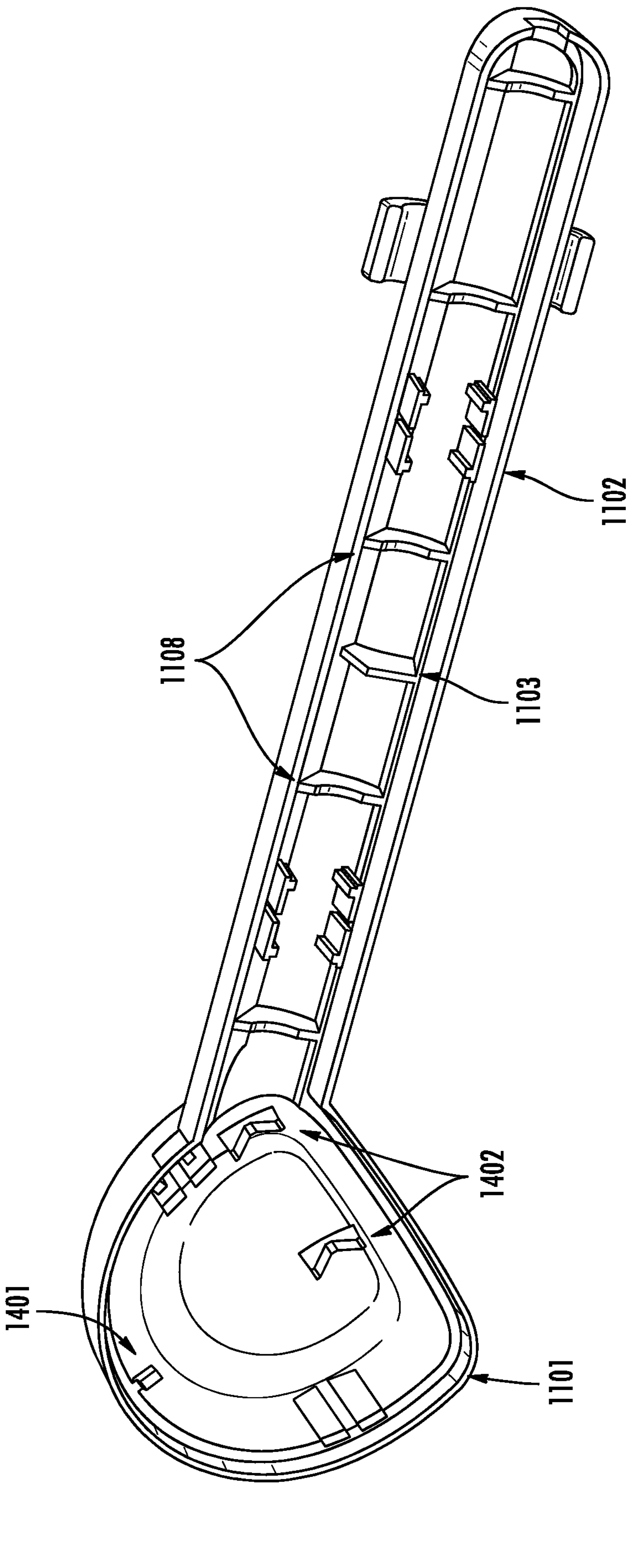
FIG. 14 is a diagram of half a housing of the enclosure in accordance with some embodiments of the present inventive concept.

FIG. 14 illustrates one piece composed of the enclosure half 1101 and the stem half 1102. Elements 1108 and 1103 are guides that pinch the wire to prevent the wires from slipping. Additionally, elements 1402 are V-shaped grooves to hold the PCB board in the enclosure. As further illustrated, there is a tab 1401 to hold the radiating element in place. The other half of the enclosure has a similar tab such that when mated together the tip of the radiating element is sandwiched together and held firmly.

Referring now to FIG. 15, embodiments of the present inventive concept having a curved stem will be discussed. Like reference numerals of FIG. 15 refer to like elements discussed above, accordingly, details with respect to each element will not be discussed in the interest of brevity. For example, element 205 is the printed circuit board (PCB), element 901 is the enclosure, element 902 is the stem and elements 903 are the wires coming from the PCB 205. As illustrated in FIG. 15, the stem 902 projects straight down perpendicular to the flat part of 901 and eventually curves into a 45 degree angle relative to both ends of the stem. This shape may improve isotropic antenna performance compared to embodiments discussed above.

Figure 16:
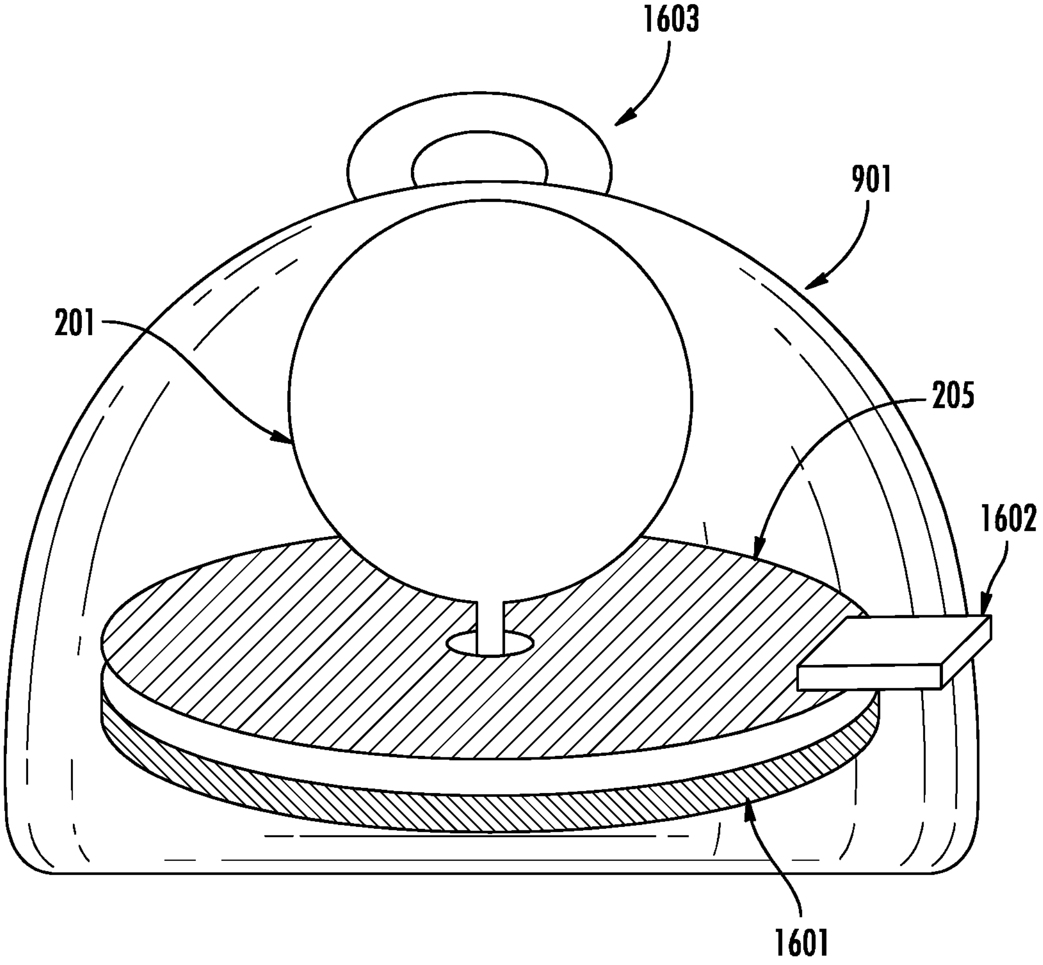
FIG. 16 is a diagram illustrating an enclosure including battery operated circuitry according to some embodiments of the present inventive concept.

Referring now to FIG. 16, battery operated embodiments of the present inventive concept will be discussed. As illustrated in FIG. 16, since the device is battery operated, it does not include the stem 902 nor the protruding wires 903 as in illustrated in embodiments discussed above, for example, FIG. 15. Instead a battery 1601 is placed below the PCB 205. The battery could be, for example, a simple coin cell battery, either rechargeable or non-rechargeable. In rechargeable embodiments, an electrical connector 1602 is used to connect to the device. In some embodiments, the connector 1602 could be in the form of a micro or mini universal serial bus (USB) type connector. The connector could be used to charge the battery in addition to providing power to the device. The connector 1602 could also be used to transfer data.

Utilizing a battery allows the form factor of the enclosure in FIG. 16 to be more compact enabling it to be portable or easily carried in a pocket, hung onto a backpack, clipped to a person, and the like. For example, in some embodiments, an optional loop 1603 may be included on the enclosure 901 so that it can be attached to a key ring, hung from a string, or the like. In some embodiments, the device in FIG. 16, the device may contain circuit elements to communicate through a secondary RF communication channel that may or may not use the radiating element 201 in addition to communicating through UWB. In embodiments where a separate antenna is used, it could be in the form of a compact chip antenna or trace antenna on the PCB board 205. The secondary RF communication may be, for example, WiFi, Bluetooth, Bluetooth low energy (BLE), near field communications (NFC) and the like. Further, an RF communication could be chosen that can communicate directly to a cell phone. For example, a secondary communication of BLE could be used to pair the device to a user's cell phone. UWB can be used for localization purposes, so location data communicated over UWB from the device could be displayed on a user's cell phone. Methods for synchronizing and locating devices in a network are discussed in, for example, commonly assigned U.S. Pat. No. 10,462,762, entitled METHODS FOR SYNCHRONIZING MULTIPLE DEVICE AND DETERMINING LOCATION BASED ON THE SYNCHRONIZED DEVICE, the contents of which are hereby incorporated herein by reference as if set forth in its entirety.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

What is claimed:

1. An antenna comprising:

a printed circuit board;

first and second radiating elements coupled to the printed circuit board and substantially perpendicular thereto, wherein the first radiating element is above a first surface of the printed circuit board and the second radiating element is below a second surface, opposite the first surface, of the printed circuit board, wherein the first and second radiating elements are flat, round and disc shaped and wherein the first and second radiating elements together provide a differential antenna; and radio frequency (RF) electronics associated with the antenna integrated with the printed circuit board.

2. The antenna of claim 1:

wherein the first and second radiating elements further include first and second tabs thereon, respectively; and wherein the printed circuit board further comprises first and second holes therein, the first tab of the first radiating element being coupled to the printed circuit board at the first hole of the printed circuit board and the second tab of the second radiating element being coupled to the printed circuit board at the second hole in the printed circuit board.

3. The antenna of claim 2, wherein the first tab is positioned in the first hole and is soldered to the printed circuit board and wherein the second tab is positioned in the second hold and is soldered to the printed circuit board.

4. The antenna of claim 1, wherein the first and second radiating elements are produced using one of water jetting or metal stamping.

5. The antenna of claim 2, wherein the first and second tabs have first and second widths, the first width being smaller than a diameter of the respective first and second holes and the second width being larger than the diameter of the respective first and second holes such that the first and second tabs cannot move further into the respective first and second holes.

6. The antenna of claim 1, wherein the first and second radiating elements have one or more holes therein.

7. The antenna of claim 1, further comprising a battery coupled to the printed circuit board.

8. The antenna of claim 7, wherein the battery comprises one of a rechargeable or non-rechargeable coin cell battery.

9. A system comprising: the antenna of claim 1, and further comprises a micro universal serial bus (USB) or a mini USB type connector on the printed circuit board that provides power and data to the system.

10. A system comprising: the antenna of claim 1, and further comprises an enclosure, the first and second radiating elements being positioned in the enclosure.

11. The system of claim 10, wherein the enclosure comprises a loop thereon to facilitate attachment of the enclosure to one of a key ring or a string.

12. The system of claim 10, wherein the system further comprises secondary RF electronics coupled or decoupled from the first and/or second radiating elements.

13. The system of claim 12, wherein the system further comprises:

wherein the secondary RF electronics comprise one of a chip antenna or a trace antenna;

wherein the secondary RF electronics communicates in one of Wifi, Bluetooth, Bluetooth low energy or near field communications (NFC); and wherein the secondary RF electronics allow communication directly with a mobile phone.

14. The system of claim 10, wherein the enclosure comprises a stem and wherein the enclosure is a two piece assembly with a dividing line extending through the stem.

15. The system of claim 14, wherein the two piece assembly includes notches that protrude into a hollow area of a tube and pinch wires therein preventing the wires from slipping when pulled on and reducing stress of a connection of wires to the printed circuit board.

16. The system of claim 14, further comprising a mount that is configured to connect to the stem of the enclosure, wherein the mount is configured to all the system to be attached to a vertical or horizontal surface.

17. The antenna of claim 1, wherein the differential antenna is used in place of a balun.

* * * * *